United States Patent [19]

Avni et al.

[11] Patent Number: 4,929,474
[45] Date of Patent: May 29, 1990

[54] METHOD OF MAKING HIGH QUALITY EXTRUSION COATED PAPER FOR QUALITY PRINTING

[75] Inventors: Eitan Avni; Simon Salama, both of Monroe, N.Y.; Eran Turi, Springfield, Mass.

[73] Assignee: Union Camp Corporation, Wayne, N.J.

[21] Appl. No.: 333,163

[22] Filed: Apr. 3, 1989

[51] Int. Cl.⁵ .................. B29C 47/06; B32B 27/10
[52] U.S. Cl. .................................. 427/326; 264/132; 264/171; 264/175; 264/237; 264/280; 427/362; 427/365
[58] Field of Search .............. 264/132, 171, 175, 237, 264/280, 348; 156/244.16, 244.23, 244.27, 277; 427/303, 326, 362, 365

[56] References Cited

U.S. PATENT DOCUMENTS

| | | | |
|---|---|---|---|
| 2,715,088 | 8/1955 | Gunning | 264/171 X |
| 3,340,124 | 9/1967 | Lowe et al. | 156/244.18 |
| 3,470,055 | 9/1969 | Wade | 156/244.27 |
| 3,911,180 | 10/1975 | Ozaki et al. | 427/362 |
| 3,911,191 | 10/1975 | Guastella et al. | 427/326 X |
| 4,133,710 | 1/1979 | Wartenberg | 156/244.27 |
| 4,222,973 | 9/1980 | Kasper et al. | 264/22 |
| 4,407,690 | 10/1983 | White | 156/244.27 |

*Primary Examiner*—Jeffery Thurlow
*Assistant Examiner*—Leo B. Tentoni
*Attorney, Agent, or Firm*—Edward J. Sites

[57] ABSTRACT

A process of producing high quality extrusion coated paper for high quality printing by extruding polyethylene on a highly smoothed base sheet of paper and passing the coated base sheet through the nip of two cooperating rollers, at least one of which rollers is a low-friction gloss chill roller having a surface finish with a degree of roughness between that of a high gloss roller and a matte finished roller.

11 Claims, 2 Drawing Sheets

METHOD OF MAKING HIGH QUALITY EXTRUSION COATED PAPER FOR QUALITY PRINTING

FIELD OF THE INVENTION

The present invention relates to a method of providing a plastic coated paper for use in high quality printing.

BACKGROUND AND SUMMARY OF THE INVENTION

There presently exist various methods for the coating of paper with a plastic material. While coated paper of various forms has a wide variety of uses in the paper industry, in certain applications there is a need for a high quality of coated paper. For purposes of high quality printing such as for magazines, annual reports and the like, the quality of paper used in such printing can be assessed by the uniform and smooth nature of the coating on the paper. For example, in cases where the coating is absent in even very small microscopic amounts or dots, this will directly affect the quality of the product and in turn the accuracy of the printing thereon. Without a high quality finish on the paper, the end result of high quality printing thereon will not be achieved.

Various methods of coating paper have been described. U.S. Pat. No. 4,133,710, entitled "Method for Forming a Polyethylene Layer on a Substrate," issued Jan. 9, 1979, describes adhering extruded polyethylene film and a paper substrate. The film and paper in this method are pressed together by passing through rollers that cool the film. A liquid is used on the surface of the roller(s) to reduce the surface tension. The method is said to reduce adhesion to the roller while providing a more uniform surface structure of the plastic coated material.

U.S Pat. No. 3,911,191, entitled "Coated Paper Products," issued Oct. 7, 1975, discloses producing a high quality product by using a highly pigmented hot melt coating composition as compared to solvent or water based systems. While such disclosures refer generally to uniformity or quality of the resulting coated paper, they do not relate it to the effect it has on the subsequent printing thereon.

Accordingly, it is an object of the invention to provide a method of producing high quality plastic coated paper which is of sufficient smoothness and uniformity to allow for high quality printing thereon.

It is another object to provide a method of making such a quality product which includes reducing or eliminating gaps or defects (pits) in the coating which are of a size equal to or greater than the dot elements of conventional printing devices.

It is by this last object that the present method is distinctly effective in providing high quality polymer coated paper. The product of this method has a smoothness or evenness of the coating which enables high quality printing by allowing the wetting of ink in the shallower defects, and by reducing the number of missing print dots and unprinted areas. By reducing the defect or pit size and density in the coating, a much improved product is ultimately achieved. The present invention accomplishes this through a combination of steps. A highly smooth calendered paper sheet is subjected to extrusion coating with a polyolefin or other extrusion coating resin. The combination paper and coating are then subjected to a low-friction gloss chill roll finish. The surprising result of this combination is that the quality of the coated paper produced allows for a quality of printing thereon which is a substantial improvement compared to coated papers of comparable prior art processes.

BRIEF DESCRIPTION OF THE DRAWINGS

Thus, by the present invention, its objects and advantages will be realized, the description of which should be taken in conjunction with that of the drawings wherein.

DETAILED DESCRIPTION OF THE PREFERRED EMBODIMENT

The present invention provides for a high quality of polymer coated paper for high quality printing. The smoother and more uniform the surface, the better the printing quality. In this regard, the smaller the gaps or pits in the coating, the better will be the printing on the paper. The present invention accordingly seeks to provide a coated paper wherein the size of the pits in the polymer coating is less than the size of the print dot used in the printing process. In addition, the density or clustering of such pit defects is reduced, which, of course, also improves the quality of the product.

Figure 1:
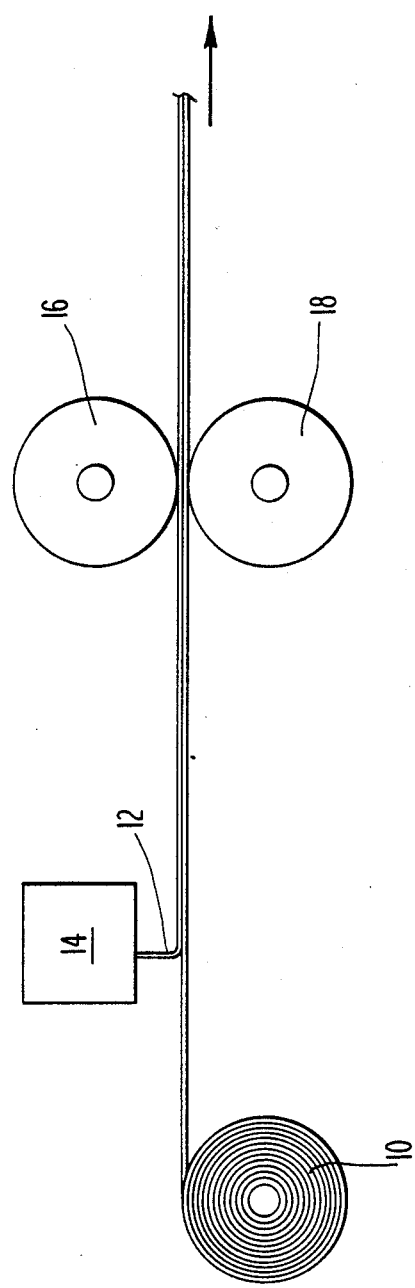
FIG. 1 is a schematic diagram of a paper extrusion coating apparatus for carrying out the teachings of the present invention.

In this regard, and with reference to FIG. 1, there is shown a schematic of the extrusion coating apparatus used in carrying out this invention. A roll of paper sheet stock or base sheet 10 is shown. The required high smoothness may be accomplished by gloss calendering, yankee drum treating, or other similar finishing. The base sheet can be, for example, a natural unbleached Kraft or, more specifically, may be comprised of 60–70% hardwood furnish which is heavily calendered. No matter which base sheet is used, it must be such that it is of a highly smooth quality. The use of the highly smooth base sheet contributes to a reduction in size of defects caused by the fiber surface network.

The next part of the process involves the application of the extrusion coating of a polyolefin 12, such as polyethylene with a melt index of 7 (i.e., Chevron 1017) or any other type suitable for the purpose. If polyethylene is chosen, it is preferably melted at above 600° F. In one particular application of this invention, the polyethylene was melted at 610° F. and extruded at a rate of 750 ft/min, with the chill rollers operating at between 50°–55° F. It is advantageous to operate the chill rollers at a temperature below the softening temperature of the polyolefin or other coating.

The application or extrusion of the polyolefin 12 onto the base sheet 10 is indicated in FIG. 1 by element 14 and may be accomplished by a number of methods. For example, application may be that as shown in U.S. Pat. No. 4,133,710; or by way of a coating head trough as shown in U.S. Pat. No. 3,911,191; or even that shown in U.S. Pat. No. 3,340,124. The combination base sheet 10 and polyolefin 12 is then passed between a chill roller 16 and a backing roller 18. The chill roller 16 should be of the low- friction gloss type which provides a finish which is between that of a smooth finish of a high gloss roller and the finish of a conventional matte finish roller. A low- friction gloss roller of the type envisioned by the present invention is, for example, that made by Wilhelm Bauer GMBH, Postfach 730023 D-3000 Hannover, Germany, specifically a glossy low-friction roller Model No. 830 303 39 having a surface chrome thickness of 0.1 millimeter.

The use of such type roller has so improved the finish imparted on the coated paper as to allow for high quality printing on the surface which has not heretofore obtainable. The roller is used at a temperature and pressure range, preferably between 10 and 30 Kg/cm$^2$, such that, in combination with the calendered smooth base sheet, the coating is spread to a uniformity such that coating defects are substantially limited to printing dot size; and such that the density of the defects is greatly reduced. The results of the use of this type roller can be seen as follows in Table A.

TABLE A

| Chill Roller Surface | Number of Missing Diamond Gardner Dots[1] | Microtopograph Roughness, μm$^2$ | |
|---|---|---|---|
| | | 10 kgf/cm$^2$ | 30 kgf/cm$^2$ |
| Low-Friction Gloss | 4.2 | 0.25 | 0.08 |
| Matte | 14.4 | 1.68 | 0.73 |
| High Gloss | N/A | 0.84 | 0.17 |

[1]Simulates gravure printing. The smaller the number, the smoother the material is with respect to gravure printing.
[2]Value is closely related to the average depth of depressions in the surface of paper pressed against a standard surface at the noted pressure. The smaller the value, the better the printing smoothness of paper.

Figure 2A:
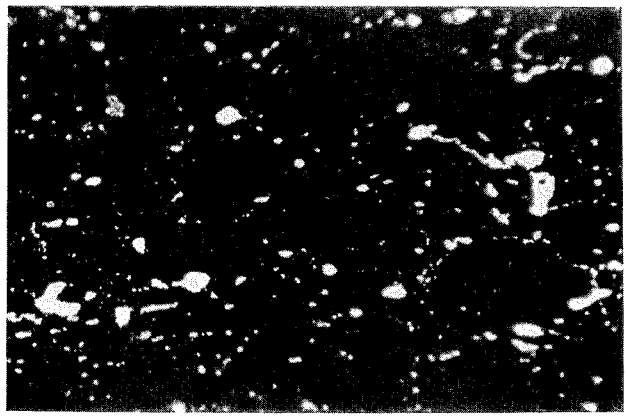
FIG. 2A is a representation of a photographic enlargement of a uniform coating of the instant invention prepared by a low-friction gloss chill roller.
Figure 2B:
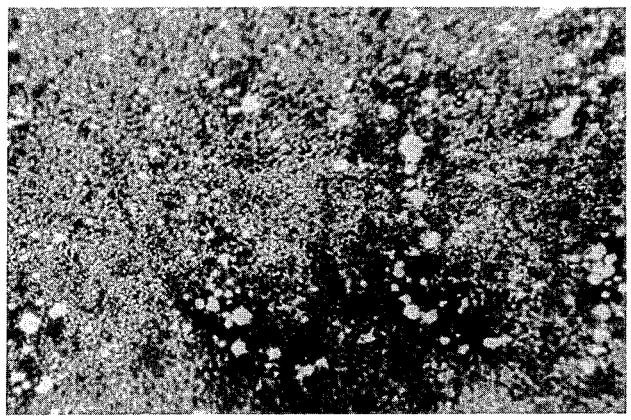
FIG. 2B is a representation of a photographic enlargement illustrating a coating prepared with a matte finish roller.
Figure 2C:
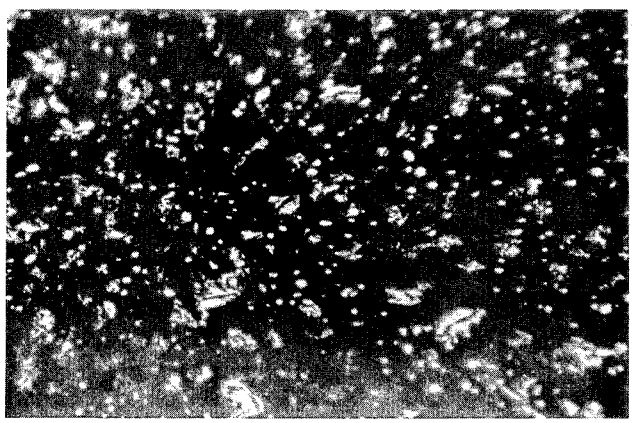
FIG. 2C is a representation of a photographic enlargement of the surface defects that occur in a coating prepared with a high gloss finish chill roller.

The dramatic results of the use of the low-friction chill roller with the very smooth paper can be seen in FIGS. 2A–2C. In each figure, the very smooth paper was used. FIG. 2C depicts the surface defects that occurred with a high gloss finish chill roller; FIG. 2B shows the results of a matte finish roller. By contrast, FIG. 2A shows the result of using a low-friction gloss chill roller of the present invention. It can be seen that the printability on the coated paper produced by the present invention is vastly superior to that provided by the other two type rollers. The process using the smooth and high gloss chill rollers produced a gravure printability which was unacceptable. The microtopographs shown in FIGS. 2B–2C illustrate these results, which are also set forth in table A.

The surface defects in the low-friction gloss chill rollers used with the highly smooth paper are much smaller and are acceptable within the Diamond Gardner test for missing dots which is within a process gravure of 0–10 and a microtopograph of 0–0.6 μm at 10 kg/cm$^2$. The defects that do occur are also much shallower than occurs with the other type rollers. Of course, depending upon the base sheet, the size, depth and density of the defects will vary accordingly.

The coordination of the smoothness of the base sheet 10 and the use of the low-friction gloss chill rollers allows control of the defect sizes to a diameter which is on the order of the distance between print dots (approximately 5–10 mil or 125–250 μm) down to the order of a dot size (approximately 10–35 μm), which are important parameters for high quality printing. The printing of the coated paper is suitably accomplished with known processes of flexography and gravure printing.

Thus, by the present invention, its objects and advantages will be realized and, although a preferred embodiment has been disclosed and described in detail, its scope should not be limited thereby, rather its scope should be determined by that of appended claims.

What is claimed is:

1. A process of manufacturing a polyolefin coated paper substrate having high quality printing thereon, said process comprising the steps of:
   providing a highly smooth base sheet of paper;
   extruding a coat of polyolefin on at least one side of the base sheet;
   pressing the coat of polyolefin and the base sheet together by passing them through a nip of a pair of cooperating rollers wherein at least one of said pair of rollers is a low-friction chill roller which contacts the polyolefin coating for reducing a plurality of surface defects in said polyolefin coating which are of a size equal to or greater than a dot element of print; and
   printing on said polyolefin coating.

2. The process in accordance with claim 1 which includes calendering the base sheet to reduce the defects in the base sheet.

3. The process in accordance with claim 2 which includes the step of providing an extrusion coating of polyethylene on the base sheet.

4. The process in accordance with claim 3 which includes the step of operating the chill roller at a temperature below a softening temperature of polyethylene.

5. The process in accordance with claim 4 which includes the step of operating the chill roller at a temperature between 50°–55° F.

6. The process in accordance with claim 5 which includes the step of applying pressure at said nip of between 10 and 30 kg/cm$^2$.

7. The process in accordance with claim 6 which includes the step of yankee drum treating the base sheet prior to coating.

8. The process in accordance with claim 7 which includes providing a base sheet of heavily calendered natural unbleached Kraft and polyethylene which is melted at above 600° F.

9. The process in accordance with claim 2 which includes the step of yankee drum treating the base sheet prior to coating.

10. A process for producing high quality extrusion coated paper with high quality printing, comprising extruding a polyethylene coating on a highly smoothed based sheet of paper, passing the paper base sheet with said polyethylene coating through a pair of rollers wherein at least one of said pair of rollers is a low-friction gloss chill roller which contacts said polyethylene coating, said passing resulting in said polyethylene coating having defect sizes limited to being on the order of printing dot size; and printing on said extrusion coated paper.

11. The process of claim 10, further comprising the step of printing on said coated paper with a process of flexography and gravure.

* * * * *